United States Patent
Lawrence et al.

(10) Patent No.: US 8,970,375 B2
(45) Date of Patent: Mar. 3, 2015

(54) MEMORY TAG, METHOD FOR PROVIDING INFORMATION AND ENABLING THE RELEASE OF STORED CONTENT, AND APPARATUS THEREFOR

(75) Inventors: Richard Anthony Lawrence, S. Glos (GB); Fraser John Dickin, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 2632 days.

(21) Appl. No.: 11/451,556

(22) Filed: Jun. 13, 2006

(65) Prior Publication Data

US 2006/0282904 A1 Dec. 14, 2006

(30) Foreign Application Priority Data

Jun. 14, 2005 (GB) .................................. 0512014.2

(51) Int. Cl.
*G08B 13/14* (2006.01)
*H04Q 5/22* (2006.01)
*G06Q 10/00* (2012.01)
*G06F 7/04* (2006.01)
*G06F 17/00* (2006.01)
*G06Q 20/32* (2012.01)
*G06Q 20/12* (2012.01)

(52) U.S. Cl.
CPC ............ *G06Q 20/327* (2013.01); *G06Q 20/123* (2013.01); *G06Q 20/32* (2013.01)
USPC ............... 340/572.1; 340/572.9; 340/10.1; 340/10.4; 726/27; 705/2; 705/3; 705/4; 705/5; 235/375

(58) Field of Classification Search
USPC ............................................. 340/572.1, 10.1
See application file for complete search history.

(56) References Cited

U.S. PATENT DOCUMENTS

| | | | | |
|---|---|---|---|---|
| 6,011,858 A * | 1/2000 | Stock et al. | .................... | 382/115 |
| 7,121,471 B2 * | 10/2006 | Beenau et al. | ................ | 235/487 |
| 7,152,045 B2 * | 12/2006 | Hoffman | ......................... | 705/43 |
| 7,228,155 B2 * | 6/2007 | Saunders | ...................... | 455/558 |
| 7,312,707 B1 * | 12/2007 | Bishop et al. | ............. | 340/572.1 |
| 7,316,032 B2 * | 1/2008 | Tayebi et al. | ................... | 705/51 |
| 7,333,001 B2 * | 2/2008 | Lane et al. | .................... | 340/10.1 |
| 7,333,479 B2 * | 2/2008 | Jalkanen et al. | .............. | 370/352 |
| 7,382,255 B2 * | 6/2008 | Chung | .......................... | 713/189 |
| 7,494,055 B2 * | 2/2009 | Fernandes et al. | ............. | 235/380 |
| 7,542,942 B2 * | 6/2009 | Peart et al. | ....................... | 705/39 |
| 7,565,542 B2 * | 7/2009 | Silverbrook et al. | ......... | 713/176 |

(Continued)

FOREIGN PATENT DOCUMENTS

| | | |
|---|---|---|
| EP | 1422658 | 5/2004 |
| WO | 2006037202 | 4/2006 |

*Primary Examiner* — Fekadeselassie Girma
(74) *Attorney, Agent, or Firm* — Trop, Pruner & Hu, P.C.

(57) ABSTRACT

A method of providing information, the method comprising interrogating a memory tag; receiving content from the memory tag by wireless electromagnetic communication in response to the interrogation, the memory tag comprising a memory and a transponder to enable the wireless electromagnetic communication; storing the content; sending a release request to an authorizer; receiving a release confirmation from the authorizer in response to the release request; and releasing the stored content in response to receipt of the release confirmation. The memory tag may contain encrypted content. A plurality of said release requests may be sent, each release request having an associated cost. An aggregate cost can then be calculated in accordance with the sum of the associated costs.

13 Claims, 4 Drawing Sheets

(56) References Cited

U.S. PATENT DOCUMENTS

| | | |
|---|---|---|
| 2004/0134994 A1 | 7/2004 | Zaba et al. |
| 2005/0108044 A1 | 5/2005 | Koster |
| 2006/0174136 A1* | 8/2006 | Lyons et al. .................. 713/189 |
| 2008/0165005 A1* | 7/2008 | Burbridge et al. ......... 340/572.1 |
| 2009/0085724 A1* | 4/2009 | Naressi et al. ............... 340/10.6 |

* cited by examiner

MEMORY TAG, METHOD FOR PROVIDING INFORMATION AND ENABLING THE RELEASE OF STORED CONTENT, AND APPARATUS THEREFOR

CLAIM TO PRIORITY

This application claims priority to co-pending United Kingdom utility application entitled, "Memory Tag, Method for Providing Information and Enabling the Release of Stored Content, and Apparatus therefor" having serial no. GB 0512014.2, filed Jun. 14, 2005, which is entirely incorporated herein by reference.

FIELD OF THE INVENTION

The invention relates to a memory tag, and a method and associated apparatus for providing information and enabling the release of stored content.

BACKGROUND OF THE INVENTION

A memory tag is described in EP-A-1422658. The tag is an RFID memory tag provided on a chip, and comprises a memory, an RFID transponder circuit, a power supply capacitor and an antenna coil.

SUMMARY OF THE INVENTION

According to a first aspect of the present invention there is provided a method of providing information, the method comprising interrogating a memory tag; receiving content from the memory tag by wireless electromagnetic communication in response to the interrogation, the memory tag comprising a memory and a transponder to enable the wireless electromagnetic communication; storing the content; sending a release request to an authoriser; receiving a release confirmation from the authoriser which is responsive to the release request; and releasing the stored content in response to receipt of the release confirmation.

According to a second aspect of the present invention there is provided a method of enabling the release of stored content, the method comprising receiving a release request from a client; and sending a release confirmation to the client in response to the release request, the release confirmation enabling stored content received from a memory tag by wireless communication to be released, the memory tag comprising a memory and a transponder to enable the wireless communication.

Typically the stored content is encrypted, the release request comprises a decryption key, and the step of releasing the stored content comprises decrypting the stored content using the decryption key.

Typically the step of releasing the stored content comprises outputting the stored content to a user interface. The user interface may be for example an audio speaker, an electronic display device, or a printer.

Typically a summary of the content, and/or a cost indication is received from the memory tag by wireless electromagnetic communication, and output to a user. The output may be in any human-discernible form. This enables a user to decide whether to send the release request, dependent on the summary and/or the cost indication, and provide user input accordingly.

Typically an authoriser address is received from the memory tag by wireless electromagnetic communication, and the release request is sent to the authoriser address. This enables different tags to be provided, each associated with a respective different authoriser.

Typically the memory tag is powered as a result of the wireless electromagnetic communication by inductive coupling.

The method lends itself to a micropayment system, in which a plurality of said release requests are sent, each release request having an associated cost; a plurality of said release confirmations are received, each release confirmation being responsive to a respective release request; and an aggregate cost is generated in accordance with the sum of the associated costs. This aggregate cost can be used to bill an account holder and/or to issue an aggregate payment instruction to a bank or other institution.

Preferably the release request and/or release confirmation are sent as Short Message Service (SMS) messages, to provide relatively low latency.

A third aspect of the invention provides apparatus for providing information, the apparatus comprising a reader adapted to interrogate a memory tag and receive content from the memory tag by wireless electromagnetic communication in response to the interrogation, the memory tag comprising a memory and a transponder to enable the wireless electromagnetic communication; a store for storing the content; means for sending a release request to an authoriser; means for receiving a release confirmation from the authoriser which is responsive to the release request; and means for releasing the stored content in response to receipt of the release confirmation.

The method/apparatus of the first aspect of the invention (which relates to a "client" end) and the method/apparatus of the second aspect of the invention (which relates to a "server" end) may be combined in an integrated system.

BRIEF DESCRIPTION OF THE DRAWINGS

Embodiments of the invention will now be described, by way of example only, with reference to the accompanying drawings in which.

DETAILED DESCRIPTION OF THE PREFERRED EMBODIMENTS

Figure 1:
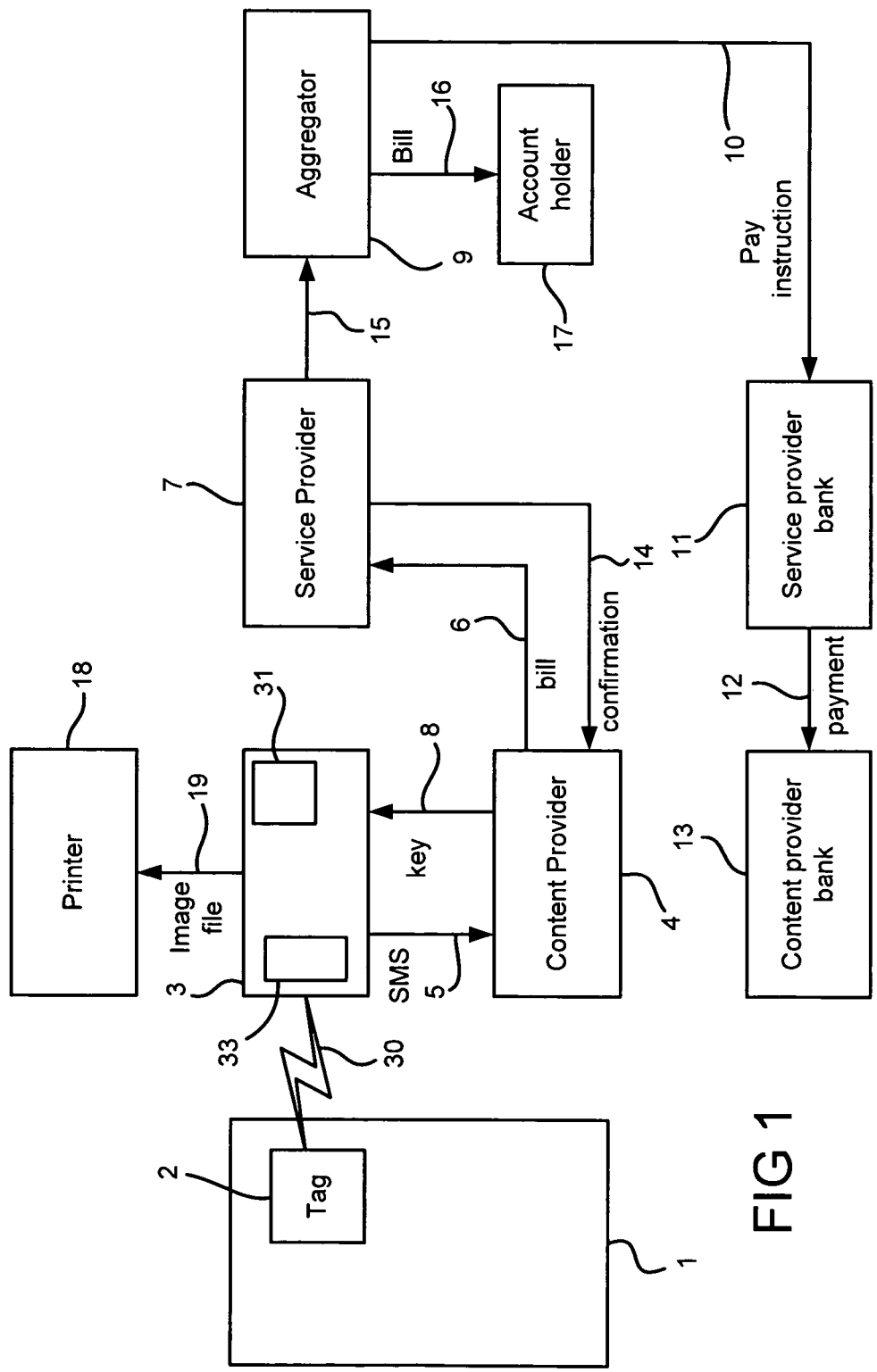
FIG. 1 illustrates, in schematic form, a system for implementing micropayments.

FIG. 1 illustrates an item, in this case a sheet of paper 1, bearing a memory tag 2. The memory tag 2 is not shown to scale, and is of an area of approximately 1-2 mm$^2$. Although only one tag is shown, a number of tags may be provided at various locations over the surface of the paper, along with printed material. The tags may be secured to the sheet of paper, or may be embedded in the sheet, preferably in locations identified by the printing, in order to assist in locating them for the purposes of reading data from or writing data to the tags.

Figure 2:
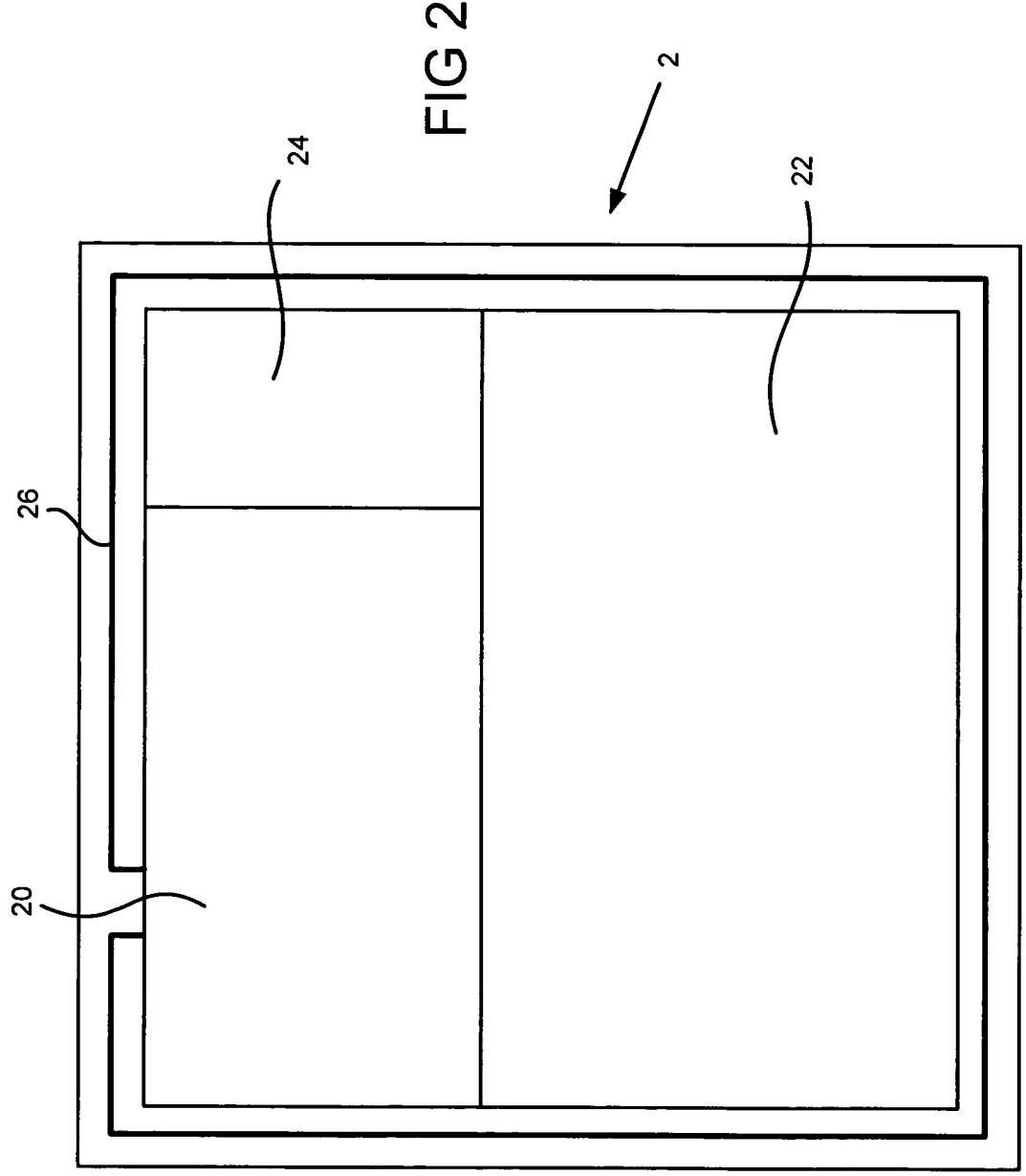
FIG. 2 illustrates an RFID memory tag.

A hand held reader 3 (which may be provided as an integrated part of a cellphone) is used to communicate with the memory tag 2 in a wireless manner. Referring now to FIG. 2, a schematic of the memory tag 2 is shown. The memory tag 2 is an RFID memory tag provided on a chip, and comprises an RFID transponder circuit 20, a memory 22, a power supply capacitor 24, and an antenna coil 26 having only a few turns e.g. five, or as in this case a single turn. The RFID transponder circuit 20 operates at 2.45 GHz, and is of an area of approximately 0.5 mm². Details of the reader 3, the circuit 20, and other features of the tag 2, are described in further detail in EP-A-1422658. The memory 22 provides 1 Mbit of capacity of non-volatile memory, is of an area of approximately 1 mm², and uses FRAM (ferroelectric random access memory) or MRAM (magnetoresistive random access memory) or similar memory technology requiring low power. The tag is of a substantially square shape in plan view with an external dimension for its side of around 1.4 mm.

The reader 3 reads the memory tag 2 by a wireless electromagnetic communication link 30, and powers the memory tag as a result of the wireless communication by inductive coupling. The reader 3 interrogates the tag by being brought into physical proximity with the tag. Optionally the step of interrogating the tag may also require a user to press a button on the keypad of the phone, causing an interrogation signal to be transmitted to the tag. In response to the interrogation, the reader 3 receives the encrypted content of the tag, a summary of the content of the tag, and a message that the content is encrypted, but can be received by messaging an address at a particular cost (for instance the cost of sending 1 SMS message plus a certain number of "upload units", or else some amount of money). The content may be encrypted by any suitable encryption method, such as PGP encryption. The content is stored onboard the reader 3 in a memory 31, and the cost and summary are output on an electronic display 33. The user is asked whether he wishes to decrypt the stored content—if the user inputs "yes", a decryption request SMS 5 is sent to a content provider 4 as described in further detail below. If "no", the content is preferably deleted directly from the memory 31. The decryption request SMS 5 is sent to the content provider 4 or their designate (a content aggregator, for example). The content provider 4 then sends a bill 6 of the agreed cost to the user's service provider 7, notifying the service provider 7 of the user's address (or some other user identifier) so that the service provider 7 can establish that the user is a valid account holder with available credit. The content provider 4 then waits for approval from the service provider 7 (or waits a set time for the service provider 6 to object) and then sends a key back to the reader 3 via an SMS message 8. The reader 3 receives the SMS message 8 and applies the key to the stored content to release it for the appropriate use. The content may of course be provided in a form in which even though unencrypted, its use is still restricted. After decrypting the content, the reader outputs the decrypted content in the form of an image file on a wireless link 19 to a printer 18. The wireless link 19 may be for example a Bluetooth, IrDA or 802.11x link.

The service provider 7 has to receive a notification that a service has been provided by the content provider 4 to the user for which there is a cost. This may be a simple (and usually small) monetary cost. The system addresses this cost by way of an aggregator 9 which groups it with other such costs for the user in billing the user, and groups it with other such credits for the content provider. Thus, the aggregator 9 receives a series of cost notifications 15 from the service provider 7 over the course of a month, sums the costs to generate an aggregate cost, and at the end of the month sends an aggregate pay instruction 10 to the bank 11 of the service provider, based on the aggregate cost. The bank 11 subsequently makes a payment 12 to the bank 13 of the content provider. The aggregator 9 also sends an aggregate bill 16 to the account holder 17, based on the aggregate cost (and any other costs incurred over the course of the month). Aggregate payment and aggregate billing both reduce the accounting overhead. The service provider 7 would logically look to take a cut of some form. An advantage of having an agreed "upload unit" is that it would be then easy to fold the cost of micropayments into a tariff. A typical tariff may cover, for example, 60 minutes of talk time, 50 SMS messages and 50 upload units.

In summary, the system of FIG. 1 provides a method of providing information, in which the reader 3 interrogates a memory tag (by being brought into proximity with the tag); in response, receives content from the memory tag 2 by wireless electromagnetic communication; stores the content in memory 31; sends a release request (the SMS 5) to an authoriser (the content provider 5); receives a release confirmation (the key 8) from the authoriser in response to the release request; and releases the stored content (by decryption and printing) in response to receipt of the release confirmation.

In the example of FIG. 1, the release request is sent to the content provider 4, and the release confirmation is received from the same entity. However, it is possible that the release request may be sent to a first entity (for instance the content provider 4) and the release confirmation received from a second entity (for instance it may be received directly from the service provider 7). In this case, the content provider 5 and the service provider 7 can be considered as separate elements of a common "authoriser".

Figure 3:
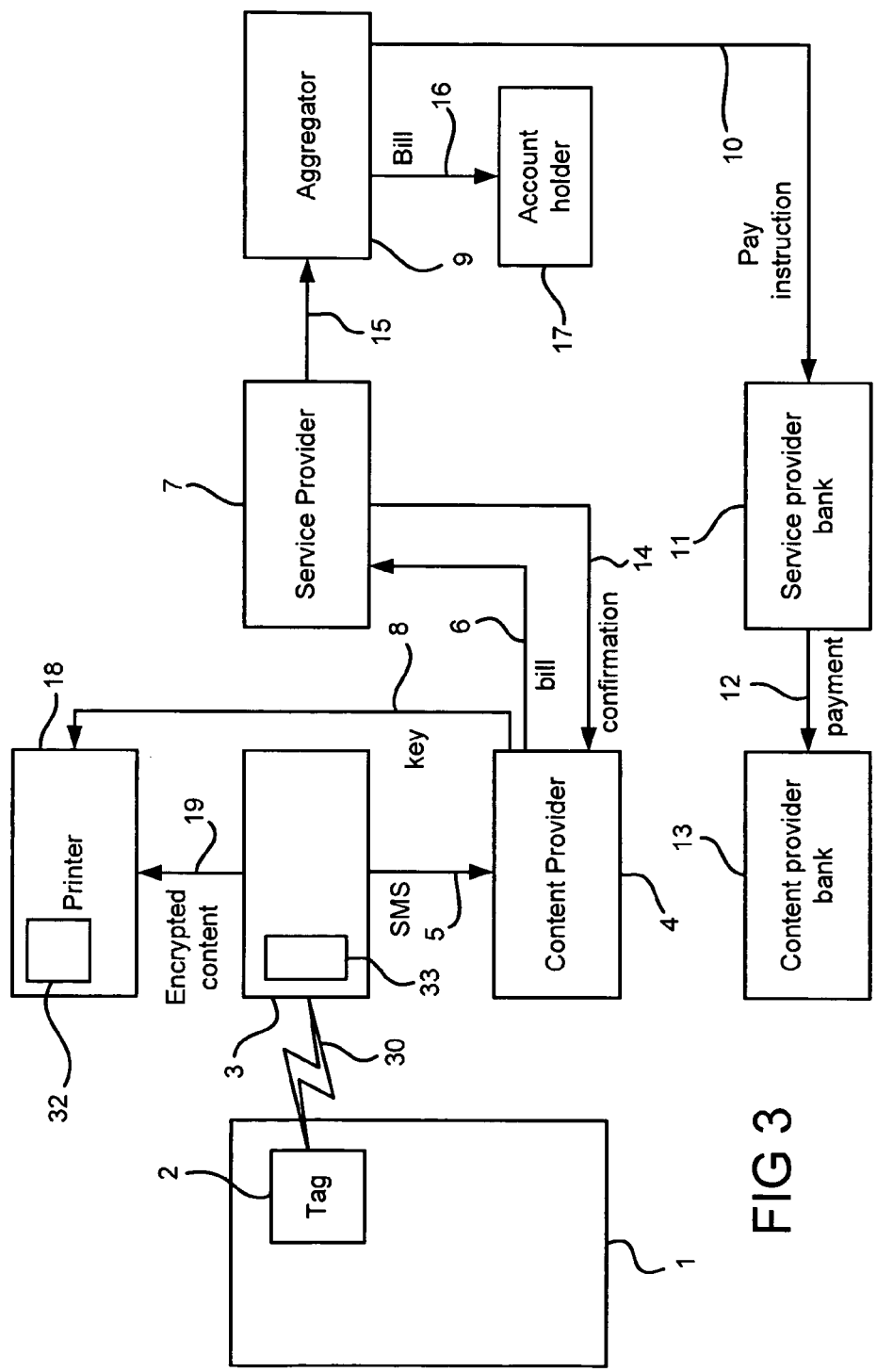
FIG. 3 illustrates a first variant of the system of FIG. 1.

A first alternative embodiment is shown in FIG. 3. Like features are given the same reference numerals as in FIG. 1. In this case, the reader 3 sends encrypted content to the printer 18, where it is stored in a memory 32. The content provider 4 sends the key 8 to the printer. The printer 18 then decrypts the stored content prior to printing.

Figure 4:
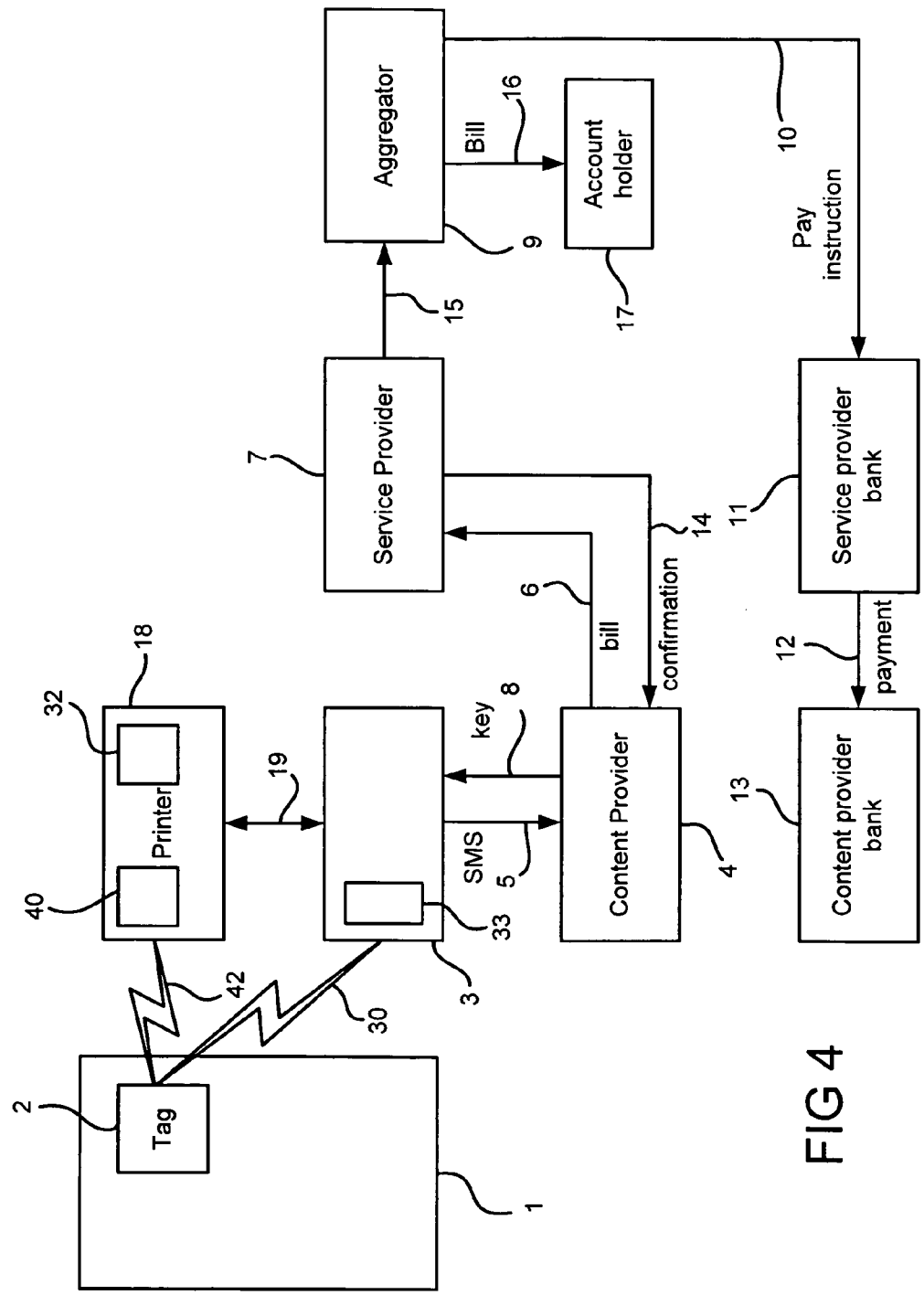
FIG. 4 illustrates a second variant of the system of FIG. 1.

A second alternative embodiment is shown in FIG. 4. Like features are given the same reference numerals as in FIG. 3. In this case, the printer 18 incorporates a reader 40 as well as memory 32. In a first step the reader 3 scans the tag via link 30, and receives the same data as in the case of FIG. 1, except it does not receive the encrypted content. The reader then obtains the decryption key as before. The tag is then read by the reader 40 and the encrypted content is downloaded via wireless link 42 and buffered in memory 32. The key is then sent to the printer 18 via wireless link 19 to enable the printer to decrypt the content and print. The embodiment of FIG. 4 covers the situation where the reader 3 does not have sufficient memory to store the content.

The micropayment mechanism described herein is probably most suitable for content which has some value but a small value. If the value is greater than this, it becomes attractive to users to make the content that they have received available on another channel (perhaps to recoup the cost). The latency, using SMS messages, should be relatively small. Security aspects could be minimised to reduced latency, particularly when the value is not great. For example, parties accept some risk by the content provider 4 providing the key directly in response to a request, on the assumption that the request is a valid one.

The invention claimed is:

1. A method of providing information, the method comprising interrogating a memory tag; receiving encrypted content from the memory tag by wireless electromagnetic communication in response to the interrogation, the memory tag comprising a memory and a transponder to enable the wireless electromagnetic communication; storing the content; sending a release request to an authoriser; receiving a release confirmation from the authoriser in response to the release request; and releasing the stored content in response to receipt of the release confirmation, comprising decrypting the stored content using a decryption key.

2. A method according to claim 1 wherein the step of releasing the stored content comprises outputting the stored content to a user interface.

3. A method according to claim 1 further comprising receiving a summary of the content from the memory tag by wireless electromagnetic communication, and outputting the summary to a user.

4. A method according to claim 1 further comprising receiving an authoriser address from the memory tag by wireless electromagnetic communication, and sending the release request to the authoriser address.

5. A method according to claim 1 further comprising receiving a cost indication from the memory tag by wireless communication, and outputting the cost indication to a user.

6. A method according to claim 1 wherein said release request is sent as a Short Message Service (SMS) message.

7. A method according to claim 1 wherein said release confirmation is received as a Short Message Service (SMS) message.

8. A method of enabling a release of stored content, the method comprising receiving a release request from a client; and sending a release confirmation to the client in response to the release request, the release confirmation enabling a decryption key to be applied to encrypted stored content received from a memory tag by wireless communication to decrypt the stored content to release the stored content, the memory tag comprising a memory and a transponder to enable the wireless communication.

9. A method according to claim 8 further comprising receiving a plurality of said release requests from said client, each release request having an associated cost; sending a plurality of said release confirmations to said client, each release confirmation being sent in response to a respective release request; summing the associated costs to generate an aggregate cost; and outputting the aggregate cost.

10. Apparatus for providing information, the apparatus comprising a reader adapted to interrogate a memory tag and receive encrypted content from the memory tag by wireless electromagnetic communication in response to the interrogation, the memory tag comprising a memory and a transponder to enable the wireless electromagnetic communication; a store for storing the content; means for sending a release request to an authoriser; means for receiving a release confirmation from the authoriser which is responsive to the release request; and means for decrypting the stored content with a decryption key to release the stored content in response to receipt of the release confirmation.

11. An apparatus comprising:
a memory; and
a reader adapted to:
  interrogate a memory tag and receive encrypted content from the memory tag by wireless electromagnetic communication in response to the interrogation;
  store the encrypted content in the memory;
  communicate a release request to an authoriser;
  receive a release confirmation from the authoriser responsive to the release request; and
  decrypt the encrypted stored content using a decryption key in response to receipt of the release confirmation.

12. The method of claim 1, wherein the acts of interrogating, receiving encrypted content, sending the release request, receiving the release confirmation and releasing the encrypted stored content are performed in a radio frequency identification reader.

13. The method of claim 8, wherein acts of interrogating, receiving encrypted content, sending the release request, receiving the release confirmation and releasing the encrypted stored content are performed in a radio frequency identification reader.

* * * * *